United States Patent [19]
Wagoner

[11] Patent Number: 5,614,812
[45] Date of Patent: Mar. 25, 1997

[54] POWER SUPPLY WITH POWER FACTOR CORRECTION

[75] Inventor: Robert G. Wagoner, Bluffton, Ind.

[73] Assignee: Franklin Electric Co. Inc., Bluffton, Ind.

[21] Appl. No.: 661,453

[22] Filed: Jun. 11, 1996

Related U.S. Application Data

[63] Continuation of Ser. No. 405,151, Mar. 16, 1995, abandoned.

[51] Int. Cl.$^6$ .................................................. G05F 1/10
[52] U.S. Cl. .............................. 323/222; 363/44; 363/89
[58] Field of Search ........................... 323/222; 363/44, 363/80, 81, 84, 89

[56] References Cited

U.S. PATENT DOCUMENTS

| | | | |
|---|---|---|---|
| 4,719,552 | 1/1988 | Albach et al. | 363/44 |
| 5,003,454 | 3/1991 | Bruning | 363/81 |
| 5,047,912 | 9/1991 | Pelly | 363/89 |
| 5,146,398 | 9/1992 | Vila-Masot et al. | 363/89 |
| 5,349,284 | 9/1994 | Whittle | 323/207 |
| 5,367,247 | 11/1994 | Blocher et al. | 323/222 |
| 5,436,550 | 7/1995 | Arakawa | 323/222 |

FOREIGN PATENT DOCUMENTS

| | | |
|---|---|---|
| 0431778A1 | 6/1991 | European Pat. Off. . |
| 0516122A2 | 12/1992 | European Pat. Off. . |
| 0580237A1 | 1/1994 | European Pat. Off. . |

*Primary Examiner*—Peter S. Wong
*Assistant Examiner*—Adolf Berhane
*Attorney, Agent, or Firm*—Marshall, O'Toole, Gerstein, Murray & Borun

[57] ABSTRACT

This disclosure relates to a power supply circuit for converting AC energy from an AC source to DC energy for powering a load. The circuit comprises first and second circuit lines and a full wave rectifier connectable to the AC source and to the circuit lines for providing a rectified input voltage on the circuit lines. An inductor is connected in one of the circuit lines and an output capacitor is connected across the circuit lines between the inductor and the load. A control switch including two power terminals and a control terminal has the two power terminals connected across the circuit lines between the inductor and the output capacitor. A sensor responsive to current flow through the inductor provides a current representative signal. A relatively high fixed frequency oscillator closes the control switch in each cycle thereof. A circuit responsive to a comparison of the input and output voltages with the current representative signal opens the control switch when the current representative signal reaches a preset value based on the input plus the output voltages.

12 Claims, 5 Drawing Sheets

FIG. 3

| VOLTAGE IN-RMS | CURRENT IN-RMS | POWER IN-WATTS | VOLT-AMP IN | POWER FACTOR | VOLTAGE OUT-DC |
|---|---|---|---|---|---|
| 199.0 | 4.250 | 811 | 852 | .959 | 273.8 |
| 219.8 | 4.395 | 942 | 979 | .965 | 295.9 |
| 240.2 | 4.561 | 1040 | 1095 | .952 | 313.2 |

FIG. 5

| VOLTAGE IN-RMS | CURRENT IN-RMS | POWER IN-WATTS | POWER FACTOR | VOLTAGE OUT-DC | CURRENT OUT-DC |
|---|---|---|---|---|---|
| 201.0 | 5.275 | 1034 | .978 | 373 | 2.52 |
| 220.9 | 4.702 | 1016 | .984 | 373 | 2.52 |
| 241.4 | 4.259 | 1004 | .970 | 373 | 2.52 |

POWER SUPPLY WITH POWER FACTOR CORRECTION

This is a Continuation of U.S. application Ser. No. 08/405,151, filed Mar. 16, 1995, now abandoned.

FIELD AND BACKGROUND OF THE INVENTION

This invention relates to a power supply for electrical equipment requiring direct current, the power supply being operable to convert an alternating current line voltage to direct current with an improved input power factor.

Conventional AC to DC converters are well known, which include a full-wave bridge rectifier and a storage capacitor. As is also well known, such a converter causes the line current to become non-sinusoidal, producing an input power factor between 0.6 and 0.7. Due to this relatively poor power factor, the circuit draws substantially more current than would be true if the load were resistive (a power factor of 1.0). A power supply with an input power factor of 0.6 to 0.7 is disadvantageous because it delivers substantially less power at a particular input current than does a power supply with a power factor of close to 1.0.

The foregoing is well known to those skilled in this art, and power supply circuits including power factor correction components have been provided. For example, the following listed U.S. patents relate to such arrangements:

| Number    | Date     |
|-----------|----------|
| 4,074,344 | 02/14/78 |
| 4,677,366 | 06/30/87 |
| 4,777,409 | 10/11/88 |
| 4,801,887 | 01/31/89 |
| 4,816,982 | 03/28/89 |
| 4,831,508 | 05/16/89 |
| 4,940,929 | 07/10/90 |
| 5,003,454 | 03/26/91 |
| 5,181,159 | 01/19/93 |
| 5,301,095 | 04/05/94 |

While the circuits described in the above patents may perform satisfactorily, there is a continuing need for a power supply including an improved power factor correction circuit, which is less complicated and less expensive than those of the prior art.

It is therefore a general object of the present invention to provide an improved power supply including a power factor correction circuit.

SUMMARY OF THE INVENTION

A power supply circuit in accordance with this invention converts AC energy from an AC source to DC energy for powering a load, and it comprises first and second circuit lines; full wave rectifier means connectable to the AC source and to said circuit lines for providing a rectified input voltage on said circuit lines; an inductor connected in said first circuit line; an output capacitor connected across said first and second circuit lines between said inductor and the load; a control switch including two power terminals and a control terminal, the two power terminals being connected across said first and second circuit lines between said inductor and said output capacitor; means responsive to current flow through the inductor for providing a current representative signal; a relatively high fixed frequency oscillator means for closing said control switch in each cycle thereof; and means responsive to a comparison of the input plus the output voltages with said current representative signal for opening said control switch when said current representative signal reaches a preset value based on the input plus the output voltages. dr

BRIEF DESCRIPTION OF THE DRAWINGS

The invention will be better understood from the following detailed description taken in conjunction with the accompanying drawings, wherein:

FIG. 3 is a chart listing test results of the circuit of FIG. 2;

FIG. 5 is a chart similar to FIG. 3 but showing test results of the circuit of FIG. 5.

DETAILED DESCRIPTION OF THE DRAWINGS

Figure 1:
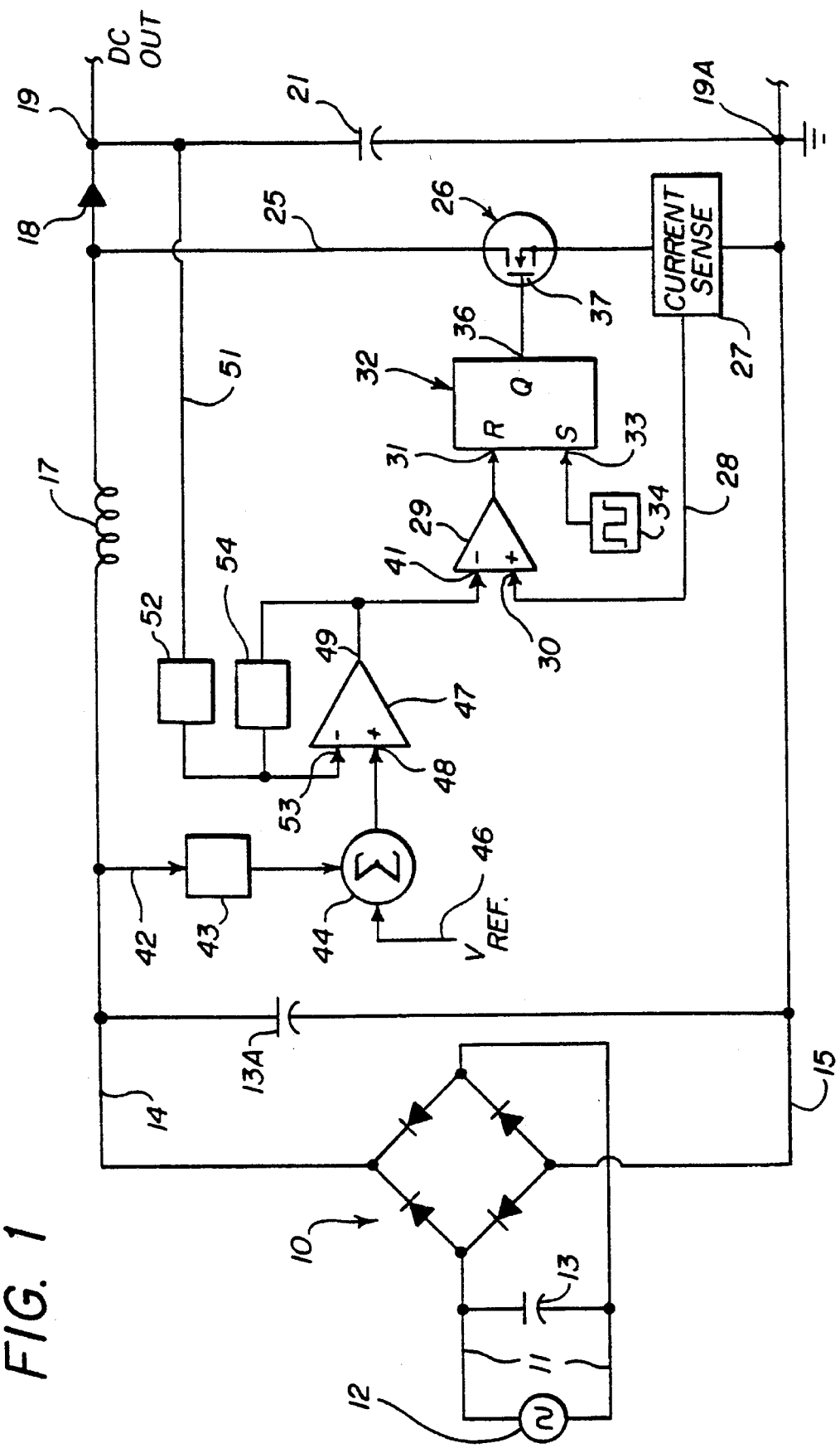
FIG. 1 is a block diagram of a circuit embodying the invention.

With reference first to FIG. 1, a full-wave bridge rectifier 10 has its input connected to lines 11 which, in use, are connected, during use, to an AC input 12 such as a 230 volt line. An input filter capacitor 13 and/or 13A is connected across the input lines 11 and/or across the bridge output lines 14 and 15. The capacitor 13 (13A) is provided to filter out the inductor ripple current.

An inductor 17 and a high speed diode 18 are connected in series in the line 14 between the bridge 10 and a DC output terminal 19. The other (return) line 15 is connected to a terminal 19A and to ground. An output filter capacitor bank 21 is between the output terminals 19 and 19A.

Figure 6:
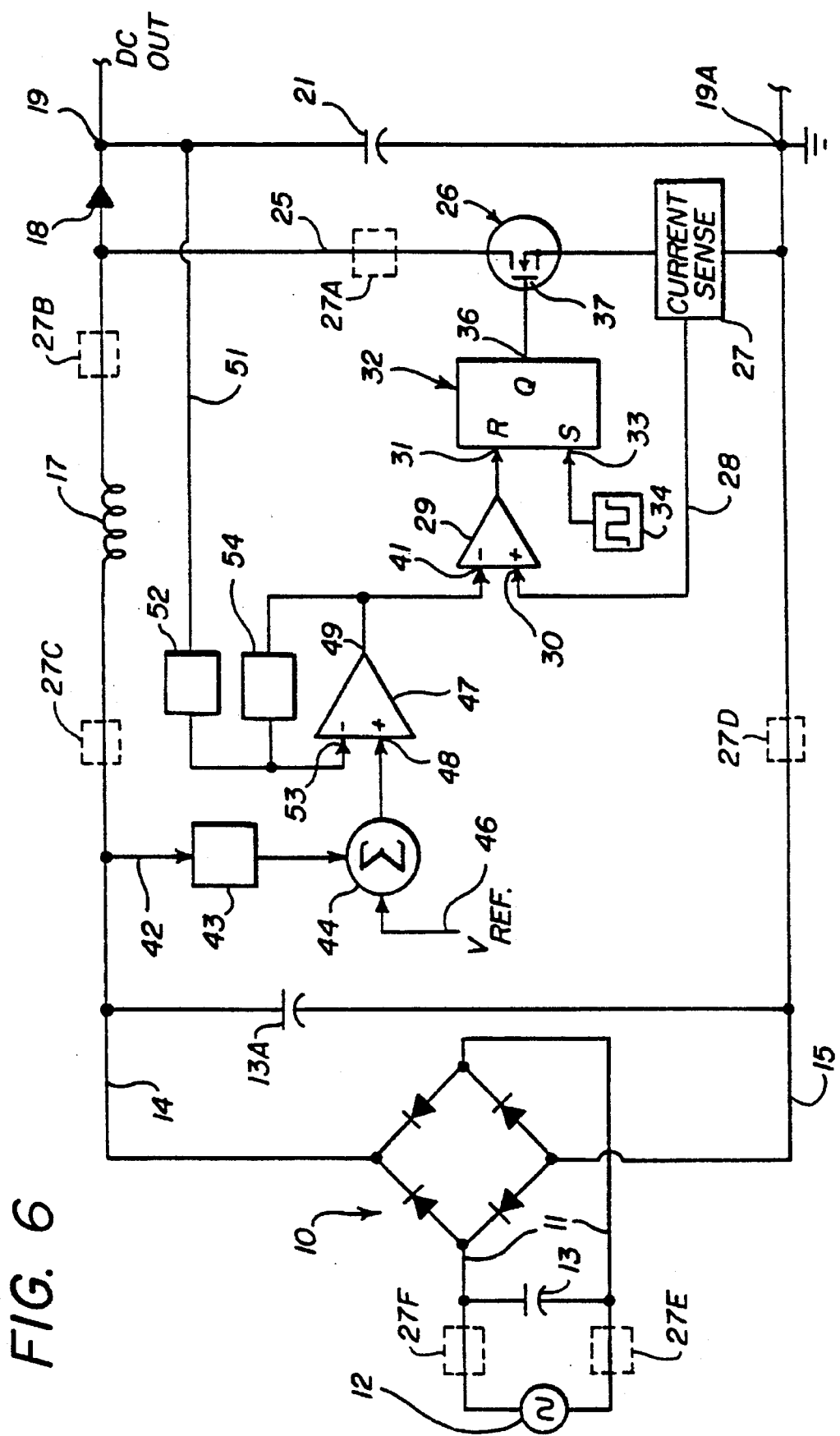
FIG. 6 is a block diagram similar to FIG. 1 but showing alternative locations of a current sensor.

A current modulator is also provided which senses the full-wave rectified line voltage and forces the input current to be substantially sinusoidal and in phase with the line voltage. The modulator includes a semiconductor switch 26 which is connected in a line 25 between the line 15 and the juncture between the inductor 17 and the diode 18. When the switch 26 is closed, the inductor 17 current flows through it, and the inductor current is sensed by a circuit 27 connected in series with the switch 26. As will be described in connection with FIG. 6, the inductor current may be sensed at other locations in the circuit. The voltage output signal of the sensing circuit 27 is connected by a line 28 to the positive (noninverting) input 30 of a voltage comparator 29, the output of which is connected to the reset input 31 of a flip-flop 32. The set input 33 receives the output of a fixed frequency oscillator 34. The Q output 36 of the flip-flop 32 is connected to the control gate 37 of the switch 26.

The negative (inverting) input 41 of the comparator 29 receives a signal representative of the input voltage on the line 14. The full-wave rectified line voltage is monitored by a line 42 which is connected through a resistor-capacitor block 43 to a summation junction 44 that also receives a reference voltage on a line 46. An error amplifier 47 has its positive input 48 connected to receive the sum output of the junction 44 and has its output 49 connected to the input 41 of the comparator 29. The DC output voltage is also monitored by a line 51 connected to the output terminal 19, the line 51 being connected through a voltage divider block 52 to the negative input 53 of the error amplifier 47. A resistor-capacitor block 54 is connected in a feedback loop between the output 49 and the input 53. The three blocks 43, 52 and 54 adjust the magnitude and phase of the voltages.

Considering the operation of the circuit, assume that the lines 11 are connected to an AC line voltage supply 12 and that the output terminals 19–19A are connected to a DC load such as an invertor and a variable speed motor. With the switch 26 open, current flows through the bridge 10, the lines 14 and 15, the inductor 17 and the diode 18, and charges the capacitor 21. The oscillator 34 signal is at a higher frequency (for example, 10 KHz to 100 KHz, but a wider range may also be acceptable) than the power line frequency, and each cycle of the oscillator 34 sets the flip-flop 32 and turns on (closes) the switch 26. With the switch 26 closed, the inductor 17 current is shunted through the switch 26 and the current sensing device 27. The diode 18 prevents the capacitor 21 from discharging through the line 25. When the current representative voltage signal on the line 28 exceeds the voltage signal at the input 41, the output signal of the comparator 29 switches and resets the flip-flop 32, thereby turning off the switch 26 and stopping current flow through the line 25. Since the oscillator 34 frequency is much higher than the power line frequency, the switch 26 may be turned on and off a number of times in each cycle of the line voltage.

The voltage signal on the input 41 is representative of the input voltage on the line 14. The voltage signal from the line 14 is modified by the block 43 and summed with the reference voltage on the line 46. The DC output voltage on the line 51 and the summation 44 voltage are fed to the error amplifier, and the error, or difference, is fed to the input 41 of the comparator 29. When the voltage on the input 30 reaches the voltage on the input 41, the switch 23 is opened. Thus by modulating the current (by opening and closing the switch 26) by a signal representative of the line voltage, the current waveform is forced to follow the voltage waveform.

Figure 2:
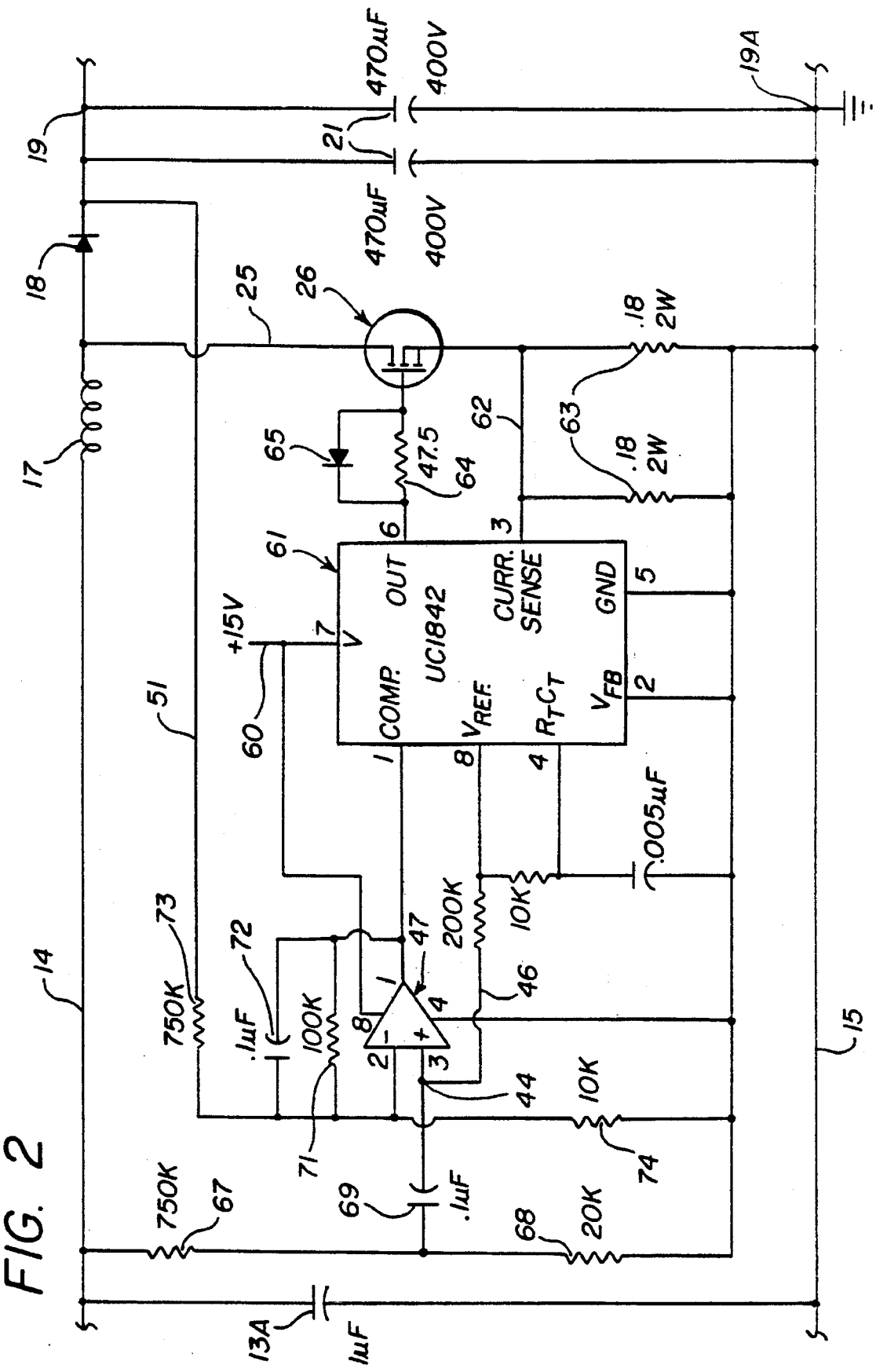
FIG. 2 is a more detailed schematic diagram of the circuit.

FIG. 2 illustrates a specific example of the circuit of FIG. 1, including values of the components and designations of some components. For the components shown in FIG. 2 which have obvious counterparts in FIG. 1, the same reference numerals are used. The rectifier bridge 10 is not illustrated in FIG. 2 but would, of course, be provided as shown in FIG. 1, and the capacitor 13 may also be provided.

The UC1842 chip 61 contains the oscillator 34, the flip-flop 32 and the comparator 29. The chip 61 is powered by a separate power supply (such as a 15 volt source) connected to a line 60. The line 62 has a voltage on it representative of the inductor current through the switch 26 and the parallel resistors 63, thus forming the current sensor 27. The chip 61 also provides the reference voltage on the line 46 which may be, for example, 5 VDC and which is connected to the summation juncture 44. The output of the flip-flop is connected to the switch 26 through a resistor 64 and an IN914 diode 65. The switch 26 is, for example, an IRFP450 semiconductor switch.

The block 43 (FIG. 1) is formed by two resistors 67 and 68 and a capacitor 69. The block 54 is formed by a resistor 171 and a capacitor 72. The block 52 is formed by two resistors 73 and 74 which form a voltage divider between the output terminals 19 and 19A. The resistors 67 and 68, of course, also form a voltage divider but are across the input lines 14 and 15.

The error amplifier 47 is an LM 358 Op Amp, and the diode 18 is an HFA15TB60. The inductor 17 has an inductance of, for example, approximately 400 µH.

FIG. 3 shows test data for the circuit of FIG. 2, and it will be noted that the power factor is better than 0.952 over a fairly broad range of input voltages.

Figure 4:
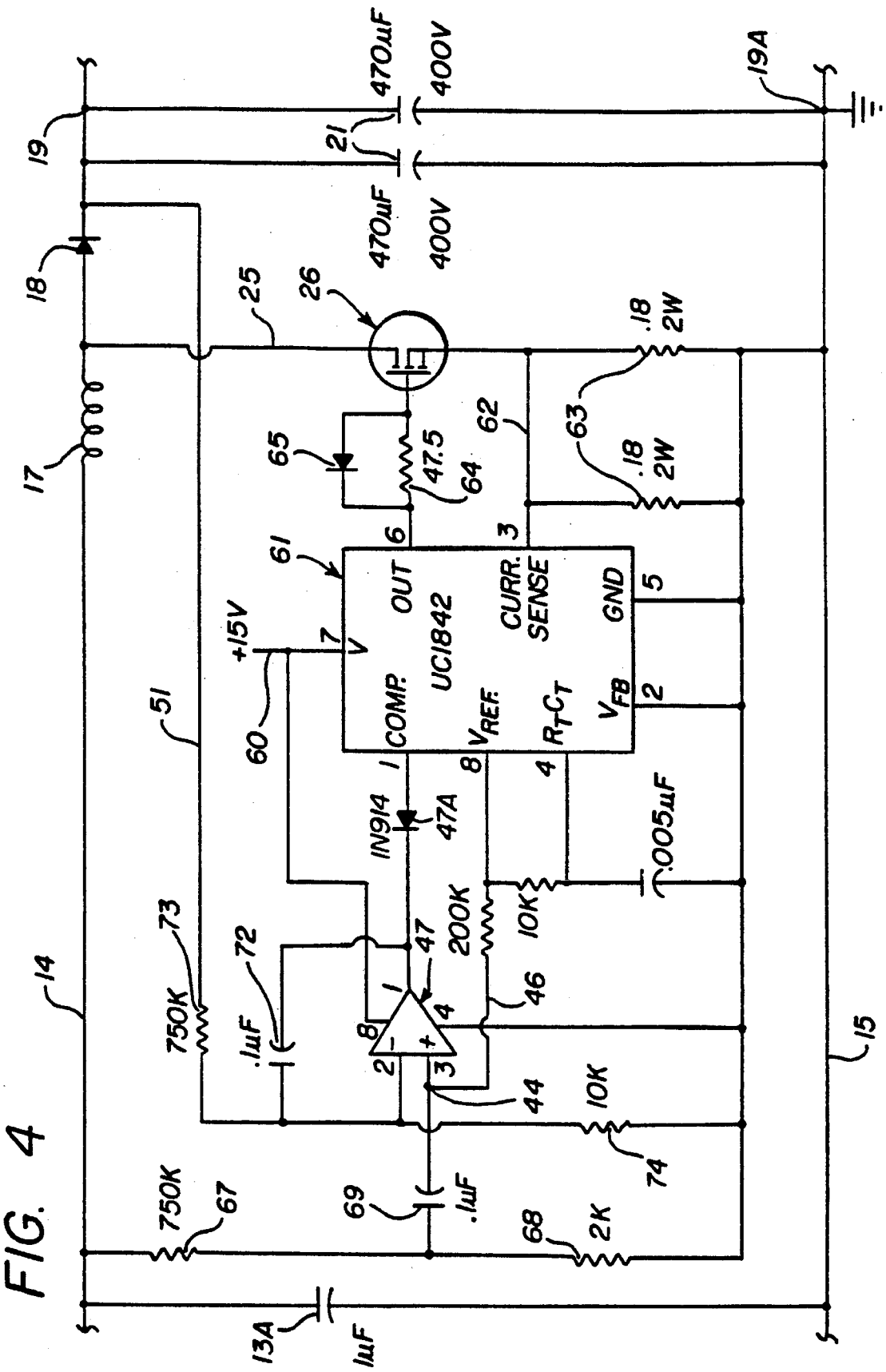
FIG. 4 is a schematic diagram similar to FIG. 2 but showing an alternative embodiment of the invention.

FIG. 4 shows a circuit similar to that of FIG. 2 but having superior test results as shown by the chart of FIG. 5. Most of the components of the two circuits are the same and therefore the same reference numerals are used. The differences are: the resistor 68 of FIG. 4 is 2K whereas the resistor 68 of FIG. 2 is 20K; the resistor 71 of FIG. 2 is eliminated in the circuit of FIG. 4; and a diode 47A is added in the circuit of FIG. 4 between the error amplifier 47 and the comparator input of the chip 61. The smaller value of the resistor 74 in FIG. 4 improves the power factor as shown in FIG. 5 (the power factor is greater than 0.970 over a broad range of voltages), and increasing the value of the resistor 71 to infinity improves the voltage regulation of the DC output.

FIGS. 1, 2 and 4 show circuits wherein the inductor current is detected by a sensor connected in series with the switch 26. Since the circuit operates only at the peak inductor current, the inductor current may instead be sensed at other locations, as illustrated by the dash-line boxes 27A to 27F in FIG. 6. The current sensing circuit may require more complex arrangements at some locations. For locating 27E and 27F, capacitors 13 and 13A would have to be small and full wave rectification would have to be added to the current signal.

Variations and modifications may be made which are encompassed by the scope of the invention and the accompanying claims. For example, in the circuit of FIG. 1, the inputs to the comparator 29 may be reversed if the inputs to the flip-flop 32 are active low.

It will be apparent from the foregoing that a novel and useful power supply including a power factor correction has been provided. The circuit employs a boost topology, operating with a fixed frequency continuous or discontinuous mode. The switch 26 is operated such that the inductor current follows or tracks the input voltage. The output voltage is also sensed and used as an outer control loop. The circuit is especially advantageous in that it is relatively simple and in that the sizes of the inductor 17 and the capacitor 21 are relatively small, thereby reducing the overall cost of the system. Compared to a standard front end, the size of the capacitor 21 may be made relatively small because its ripple current is relatively low when the input power factor is nearly 1.0. This capacitance may be reduced and the ripple voltage will be substantially the same as in a standard front end circuit. The diode bridge 10 may have a reduced current rating because of the near unity power factor.

What is claimed is:

1. A power supply and power factor correction circuit comprising first and second circuit lines; rectifier means having an output connected across said circuit lines and an input connectable to an AC source for providing a rectified DC input voltage on said circuit lines; an inductor connected in one of said lines; an output capacitor connected across said lines and a DC output voltage representative signal appearing across said output capacitor, said inductor being between said rectifier and said output capacitor; a control switch including two power terminals and a control terminal, said two power terminals being connected across said power lines between said inductor and said output capacitor; means responsive to current flow through said inductor for providing a current representative signal; oscillator means having a fixed frequency higher than the frequency of the AC source and operatively connected to said control terminal for closing said control switch in each cycle thereof; means responsive to said input voltage for providing an input voltage representative signal, reference means for providing a DC reference voltage. summing means for summing said input voltage representative signal and said reference voltage and forming a summation signal, error means responsive to said summation signal and to said output voltage representative signal for providing an error signal proportional to the difference between said output voltage representative signal and said summation signal, and comparison means responsive to said current representative signal and to said error signal for opening said control switch when said current representative signal reaches a preset value relative to said error signal.

2. A circuit as set forth in claim 1, wherein said current flow responsive means is connected in series with said control switch.

3. A circuit as set forth in claim 1, wherein said current flow responsive means is connected in one of said circuit lines.

4. A circuit as set forth in claim 1, wherein said current flow responsive means is connected in said input of said rectifier means.

5. A circuit as set forth in claim 1, wherein said means responsive to said input voltage is connected to said circuit lines between said rectifier means and said inductor.

6. A circuit as set forth in claim 1, and further comprising a flip-flop including set and reset inputs and an output, said output being connected to said control terminal, said input being connected to said comparison means, and said set input being connected to said oscillator means.

7. A power factor correction circuit comprising first and second circuit lines operable to be connected to an output of a rectifier for providing a rectified DC input voltage on said circuit lines; an inductor connected in one of said lines; an output capacitor connected across said lines and a DC output voltage representative signal appearing across output capacitor, said inductor being between said rectifier and said output capacitor; a control switch including two power terminals and a control terminal, said two power terminals being connected across said power lines between said inductor and said output capacitor; means responsive to current flow through said inductor for providing a current representative signal; oscillator means having a fixed frequency higher than the frequency of the AC source and operatively connected to said control terminal for closing said control switch in each cycle thereof; means responsive to said input voltage for providing an input voltage representative signal, reference means for providing a DC reference voltage, summing means for summing said input voltage representative signal and said reference voltage and forming a summation signal, error means responsive to said summation signal and to said output voltage representative signal for providing an error sisal proportional to the difference between said output voltage representative signal and said summation signal, and comparison means responsive to said current representative signal and to said error signal for opening said control switch when said current representative signal reaches a preset value relative to said error signal.

8. A circuit as set forth in claim 7, wherein said current flow responsive means is connected in series with said control switch.

9. A circuit as set forth in claim 7, wherein said current flow responsive means is connected in one of said circuit lines.

10. A circuit as set forth in claim 7, wherein said means responsive to said input voltage is connected to said circuit lines.

11. A circuit as set forth in claim 7, and further comprising a flip-flop including set and reset inputs and an output, said output being connected to said control terminal, said reset input being connected to said comparison means, and said set input being connected to said oscillator means.

12. A power supply and power factor correction circuit, comprising first and second circuit lines; a full wave rectifier connected to said circuit lines for forming a rectified input voltage on said circuit lines; an inductor connected in said first circuit line; an output capacitor connected across said circuit lines, said inductor being between said output capacitor and said rectifier; a control switch including two power terminals and a control terminal, said power terminals being connected across said lines between said inducter and said output capacitor; current means responsive to current through said inducter for providing an inductor current representative signal; a flip-flop having an output connected to said control terminal and having set and reset inputs; a fixed frequency oscillator connected to said set input; a comparator having first and second comparator inputs and an output connected to said reset input; and voltage means responsive to an error between said input voltage and a reference voltage and to an output voltage on said output capacitor for providing a voltage representative signal, said voltage representative signal being connected to said first comparator input; said second comparator input being connected to receive said inductor current representative signal; said comparator forming a comparison signal which resets said flip-flop when said inductor current representative signal reaches said voltage representative signal at substantially the peak of said inductor current representative signal.

\* \* \* \* \*